United States Patent [19]

Reagan

[11] Patent Number: 4,471,391
[45] Date of Patent: Sep. 11, 1984

[54] TAPE TIMER FOR TAPE RECORDER/REPRODUCER

[75] Inventor: Rick L. Reagan, Santa Clara, Calif.

[73] Assignee: Ampex Corporation, Redwood City, Calif.

[21] Appl. No.: 364,724

[22] Filed: Apr. 2, 1982

[51] Int. Cl.³ .............................................. G11B 15/18
[52] U.S. Cl. ..................................... 360/723; 360/70; 360/137
[58] Field of Search ........................ 360/72.1, 72.3, 73, 360/70, 75, 137

[56] References Cited

U.S. PATENT DOCUMENTS

| | | | |
|---|---|---|---|
| 3,939,490 | 2/1976 | Opelt | 360/70 X |
| 4,037,260 | 7/1977 | Busby, Jr. et al. | 360/73 |
| 4,062,048 | 12/1977 | Weber | 360/72.3 |

Primary Examiner—John H. Wolff
Attorney, Agent, or Firm—Harry G. Thibault; Joel D. Talcott

[57] ABSTRACT

An improved tape timer is achieved by using pulses generated by a control track previously recorded on magnetic tape to determine the magnitude of phase shift between said control track pulses and pulses generated by a mechanical tachometer in contact with the magnetic tape. The pulses generated by said mechanical tachometer are counted and said counting sequence used to generate a pulse to up-date a tape timer. In response to a detected phase shift, the count sequence is dynamically adjusted by an amount determined by the magnitude of the phase shift in such a manner as to reduce said phase shift.

13 Claims, 7 Drawing Figures

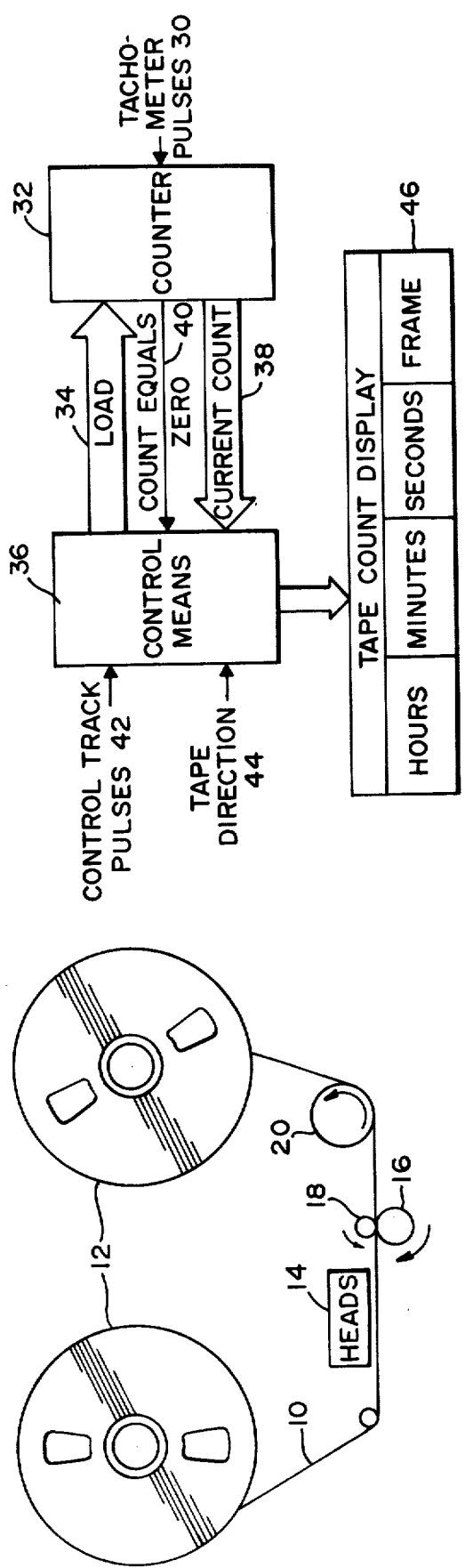
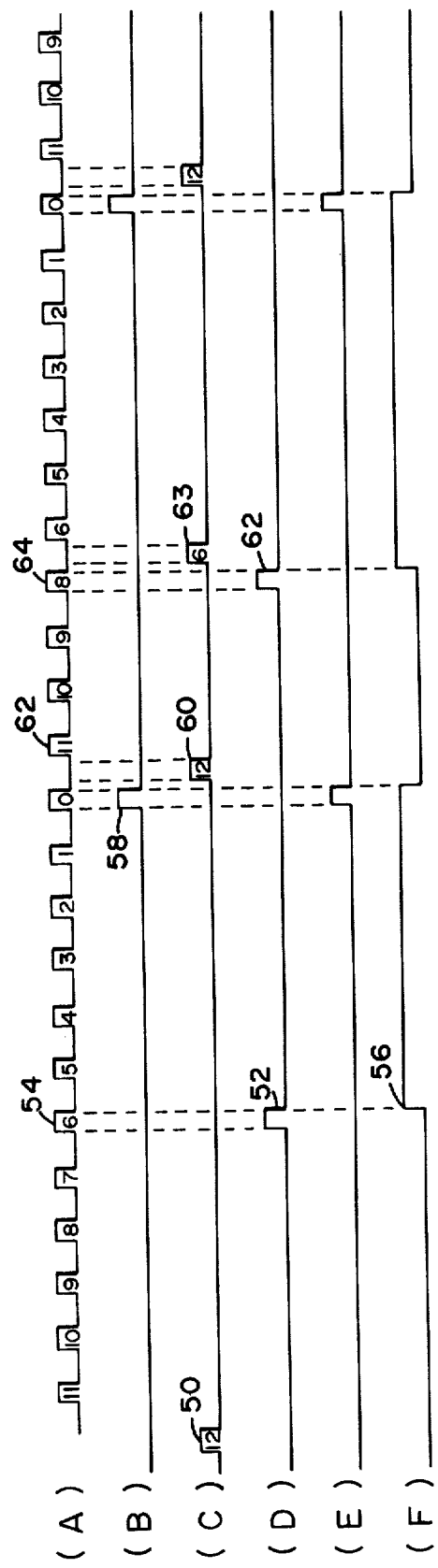

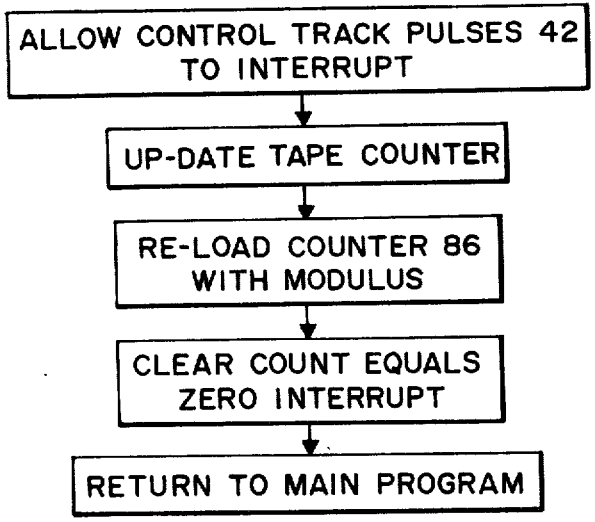
FIG_5A
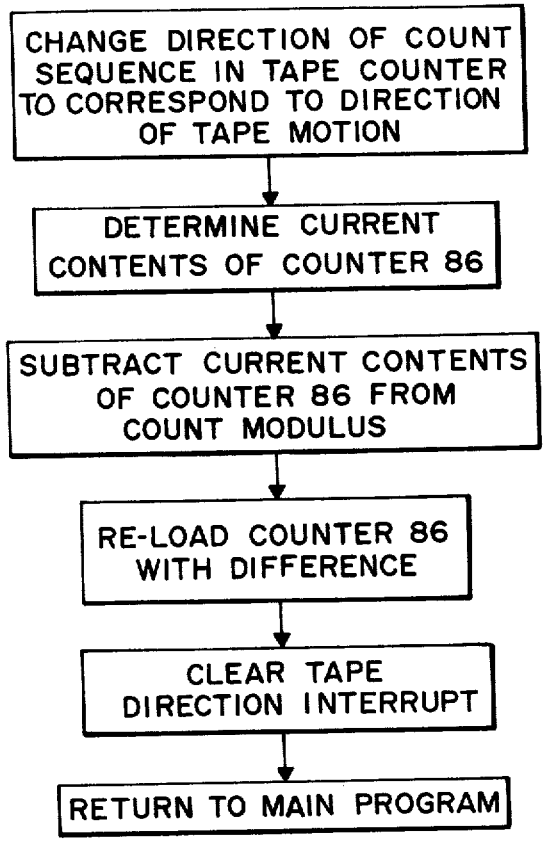
FIG_5C
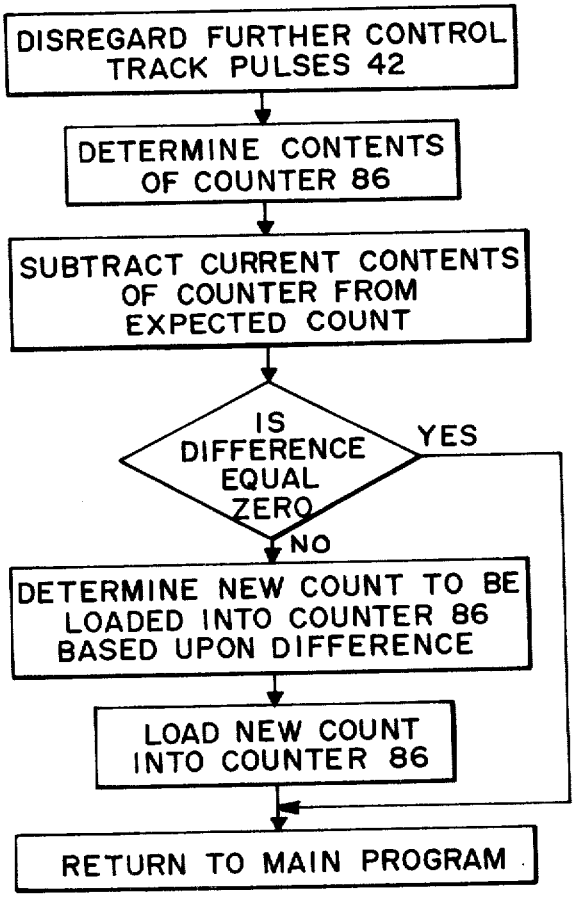
FIG_5B

TAPE TIMER FOR TAPE RECORDER/REPRODUCER

This invention relates to tape drive apparatus and, more particularly, to an improved tape timer system for indicating position of recording tape, moved by a drive mechanism, relative to a tape head.

Tape recording systems generally include provisions for indicating the longitudinal position of recording tape relative to a tape head, e.g., a magnetic record or reproduce head. These devices, typically known as tape timers, are known as such because the tape position indication is often displayed in a scale of time (hours, minutes, seconds) or, in the case of video recording systems and television signals, also frames. Prior art tape timer systems have assumed four different basic forms, namely: purely mechanical tape counters, tachometer type systems, control track type systems, and combinations of tachometer and control track systems.

The purely mechanical type counters are often found in inexpensive audio recorders. Such recorders are usually driven by a belt attached to a reel or to a tape idler, and consequently produce a non-linear relationship between the generated indication and actual tape position. A disadvantage of the mechanical type counter is, however, that there is usually a considerable amount of slip and consequently a high degree of inaccuracy associated with its use. In addition, they do not provide electrical signals related to tape travel.

The tachometer type tape system develops periodic electrical pulses related to the movement of the drive mechanism which, in turn, is related to tape movement. Typically this is done by employing a tachometer wheel coupled to rotate as the tape is transported. Tachometer sensors produce pulses as the tachometer wheel rotates and these pulses are counted to provide information as to the length of tape which has been transported past the tape head. The tachometer information is accordingly mechanically derived and its accuracy therefore depends upon maintaining a constant relationship between the number of tachometer pulses generated and the actual longitudinal length of tape transported past the magnetic head location. Tape slippage, creep, changes in tape stretching and transport tension, the fact that the tape is reproduced on different recorders than it was recorded on with differences in tension, capstan diameters and capstan surface slip coefficients, etc., cause changes in the relationship which, in turn, cause inaccuracies in the length measure.

The control track type system utilizes timing information recorded on the tape itself, which information is read from the tape as it passes the magnetic head location. Such timing information is recorded on the tape to provide information for controling the operation of tape recorders. However, such information has been used for tape timing purposes as well. Pulses are developed from information recorded directly on the tape, which are directly related to the longitudinal spacing of recorded information on the tape. Such a system circumvents the inaccuracies of the mechanical tachometer system since such recorded information accurately reflects the length of tape transported past the mechanical head locations. This avoids inaccuracies due to stretch or shrinkage of the tape or slippage thereof.

In some circumstances, such as in video recording applications, there may be a total absence of recorded timing information on the tape for a portion of the tape length. Under such circumstances, the absence of timing information causes a consequent inability of the tape timer to function.

To counteract the problems inherent in the tachometer type and control track type tape timer systems, tape timer systems have been developed employing a combination of the tachometer and control track systems, as illustrated in U.S. Pat. No. 4,037,260, entitled Tape Timer Error Corrector Circuit For Tape Recorder/Reproducer issued July 19, 1977 in the name of Edwin S. Busby and Reginald W. Oldershaw, and U.S. Pat. No. 4,062,048 entitled Tape Timer Apparatus and Method Employing A Phase Comparison Between Sequential Pulse Trains issued July 19, 1977 in the name of Donald William Webber. A tachometer pulsing system is used to provide consistent timing pulses related to the mechanical drive mechanism and these pulses are employed as the principal source of tape timing information. Control track pulses are also detected, if present, and are employed in a suitable fashion to adjust the tachometer pulses to correctly relate them to the length of the tape transported past the recording head. Such a system avoids timing inaccuracy due to tape slippage and changes in tape length inherent in the tachometer type systems while at the same time avoiding disfunction caused by dropout information inherent in control track timing systems.

Although the combination type systems described in the previous paragraph provide freedom from the problems mentioned, prior art systems of this type have suffered from certain limitations. Among these limitations is the inability of such systems to accommodate variations in longitudinal tape speeds, thus requiring operation at fixed longitudinal tape speeds.

In addition, such combination systems frequently suffered from spurious response to tape noise.

In addition, such prior art systems, due to the techniques employed in attempts to limit interference from spurious response to tape noise, have resulted in designs which are insensitive to control track pulses which occur during particular portions of longitudinal tape motion, and in fact rely on speed variations to correct this problem.

Furthermore, prior art systems have limited abilities to respond to detected differences between tachometer and control track pulses, generally being limited to changes in fixed amounts. Consequently, they have been unable to dynamically adjust the amount of correction employed in response to varying amounts of differences detected between tachometer and control track pulses.

In the present invention, periodic electrical first pulses are developed by a tachometer system related to movement of the tape drive mechanism which is in turn related to longitudinal tape movement relative to the tape head. Periodic electrical second pulses are developed related to longitudinal spacing of recorded information on the tape from the control signal previously recorded on the tape. A series of count sequences of dynamically varying length is produced by an electrical counter in response to pulses from the tachometer system and control signals from a phase difference detection system. Upon detection of a phase difference between the control track pulses and the pulses generated by the mechanical tachometer, the count sequence of the counter is dynamically modified, by an amount which is determined by the magnitude of the detected phase difference. Consequently the present invention provides correction in response to a detected phase difference in amounts which are determined by the amount of phase difference detected. An indication of tape position is produced which is related to the completion of count sequences. Thus, the tape position indication is adjusted as a result of the phase shifting of the sequences count pulses to coincide with the control track pulses.

In the present invention, the amount of phase adjustment affected in response to a detected phase shift is easily variable at the time of system design. Consequently, the response of the present invention to a detected phase error can be varied depending upon the desired response characteristics of a system incorporating it.

In addition, the present invention provides an improved technique for responding to control track pulses in the presence of noise.

The invention, as described herein, is particularly related to and advantageous in the case of video tape recording and is described, at least in portions, in that context. It will be apparent to those skilled in the art, however, that the invention is applicable to the tape timing systems used in connection with the recording of information other than video signals.

FIG. 1 illustrates the basic layout of a magnetic tape transport.

FIG. 2 is a block diagram which illustrates the method of operation of the present invention.

FIG. 3 is a series timing diagrams labeled 3A–3F which illustrate the timing relationships present in and the operation of the present invention.

FIG. 5 is a flow chart which illustrates the operation of the present invention in response to certain signals.

Figure 4:
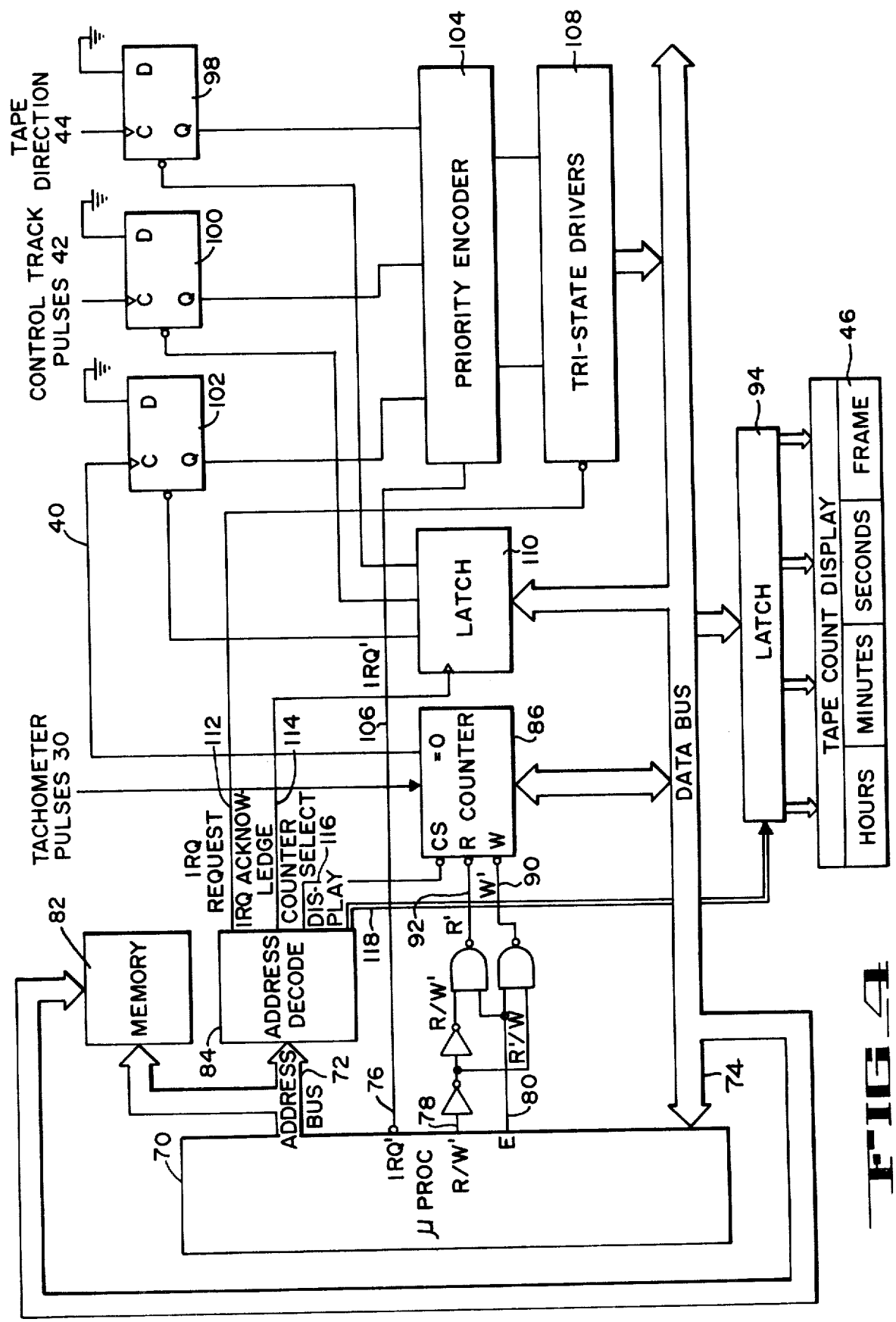
FIG. 4 is a schematic diagram of the implementation of the preferred embodiment of the present invention.

Referring now to FIG. 1, a tape transport for longitudinal recording is illustrated for simplicity, although an arrangement for helical or other recording scheme may be used in the same manner. Magnetic tape 10 stored on reels 12 is moved past magnetic heads 14 by a pinch roller 16 in contact with capstan 18. Magnetic tape 10 partially wraps around hub 20. Consequently when magnetic tape 10 is moving longitudinally, hub 20 rotates in a direction determined by the direction of motion magnetic tape 10.

The shaft of hub 20 is coupled to a tachometer (not shown) which produces electrical pulses in response to rotation. The frequency of pulses so produced for a given longitudinal tape speed is a matter of choice at the time of design of the tachometer. For a given tachometer design, the total number of pulses generated between receipt of sequential control track pulses is a known quantity which, in the absence of tape slippage or creep, etc., is a constant. Consequently by counting the number of tachometer pulses received between sequential control track pulses, the presence of tape slippage, creep, etc., can be detected as a change in phase between control and tachometer pulses.

The general method of operation of the preferred embodiment of the present invention can be understood by reference to FIG. 2. Counter 32 is an electronic counter, which is arranged to decrement by a count of one upon receipt of each tachometer pulse 30. Control Means 36 functions to drive Tape Count Display 46 which indicates tape position in an hour, minutes, seconds, and frames format, and to control the operation of Counter 32 in response to Control Track Pulse signal 42, Tape Direction Signal 44 and Count Equals Zero signal 40.

Control Means 36 initially places a value in Counter 32 by Load signal 34 which represents the total number of tachometer pulses expected to be received between sequential Control Track Pulses 42. This number will hereafter be referred to as the count modulus. Thereafter, on the occurrence of each Tachometer Pulse 30, the contents of Counter 32 are decremented by one. When the value present in Counter 32 reaches zero, Control Means 36 is advised of same by Count Equals Zero signal 40. Thereafter, Control Means 36 again loads Counter 32 with the number representative of the total number of Tachometer Pulses 30 expected to be received between sequential Control Track Pulses 42, and accordingly updates Tape Count Display 46 to reflect the corresponding longitudinal tape displacement in the appropriate manner, depending upon the direction of tape motion, as supplied by Tape Direction Signal 44.

In the foregoing discussion the occurrence of Control Track Pulses 42 was not considered. Control Track Pulses 42 may occur at any point during the decrementing process taking place in Counter 32 between the initial loading of a starting number by Load signal 34 and the occurrence of the contents of Counter 32 reaching zero. The point in time at which Control Track Pulse 42 will normally be received is a matter of choice at the time of system design. In the preferred embodiment, Control Track Pulses 42 are received when the count present in Counter 32 has decremented to half of its initial value. Consequently, upon receipt of a Control Track Pulse 42, Control Means 36 will determine the present value of the number present in Counter 32 by Current Count signal 38, and compare this value against the known correct value. A non-zero difference between the current count present in Counter 32 and the known correct count indicates the presence of a phase difference between Control Track Pulses 42 and Tachometer Pulses 30. The magnitude of said phase difference is indicative of the amount of said phase difference. The sign of said difference indicates the direction of said phase change.

When a phase difference has been detected, Control Means 36 will thereafter adjust for same by placing a new value in Counter 32 by Load signal 34 which reflects the desired amount of correction. Thereafter, Counter 32 will continue to decrement upon the receipt of each Tachometer Pulse 30 until the contents of Counter 32 reach zero. At this point, Control Means 36 is advised of said status by Count Equals Zero Signal 40, and the process repeats.

Control Means 36 up-dates the tape count and consequently Tape Count Display 46 each time the contents of Counter 32 reach zero. Consequently by adjusting the value present in Counter 32 upon the occurrence of each Control Track Pulse 42 in response to a detected phase error, the adjustment for a detected phase error is reflected in the value in Tape Counter Display 46.

As the occurrence of Control Track Pulses 42 directly controls the detection of the presence of a phase shift, it is clear that spurious signals present on this signal line would have a direct inpact on the accuracy of the present system. In the present invention improved noise immunity is achieved by Control Means 36 disregarding any subsequently received pulses on the Control Track Pulse input after receipt of an initial Control Track Pulse 42 until the contents of Counter 32 reach zero. It is only thereafter that the present invention will again start "looking" for the presence of a Control Track Pulse 42. In this manner, the present invention is insensitive to spurious signals which may be present on the Control Track Pulse signal 42 between the occurrence of a first Control Track Pulse and the subsequence occurrence of the contents of Counter 32 reaching zero.

An example will serve to illustrate the operation as heretofore described. It is of course clear that the following example is for illustrative purposes only, and in no way is intended to limit the present invention.

For the purpose of the following example, it will be assumed that the count modulus is twelve, i.e., twelve Tachometer Pulses are received between sequential Control Track Pulses.

FIG. 3 illustrates the timing relationships among the various signals. FIG. 3A illustrates Tachometer Pulses 30 and the corresponding contents of Counter 32. FIG. 3B illustrates Count Equals Zero signal 40. FIG. 3C illustrates Load signal 34, and the corresponding numeric value loaded into Counter 32. FIG. 3D illustrates Control Track Pulse signal 42. FIGS. 3E and 3F illustrates conditions internal to Control Means 36, i.e. the signal which up-dates the Tape Counter and the period of time during which Control Means 36 disregards Control Track Pulses 42.

Counter 32 (FIG. 1) is initially loaded with the count modulus twelve, as indicated by pulse 50 in FIG. 3C. Thereafter, as shown in to FIG. 3A, the contents of Counter 32 are sequentially decremented upon receipt of each Tachometer Pulse. Upon receipt of Control Track Pulse 52, FIG. 3D, Control Means 36 determines the current contents of Counter 32 by Current Count Signal 38 (FIG. 2). In the present example, this is the value of six, as indicated by pulse 54 in FIG. 3A. Control Means 36 determines the difference between the current contents of Counter 32 and the expected count (six). If the difference is zero, a zero phase shift between control track pulses and tachometer pulses is indicated. As a zero phase shift has been determined, it is not necessary to adjust the counting sequence of Counter 32. Control Means 36 thereafter disregards any subsequent pulses from Control Track Pulses 42 as illustrated by pulse 56 in FIG. 3F.

Counter 32 continues to decrement in response to subsequently received Tachometer Pulses 30. When the contents of Counter 32 equal zero, as indicated by pulse 58 in FIG. 3B, Control Means 36 does several things. First, Control Means 36 updates the count present in the Tape Counter. Depending upon the direction of tape motion this will result in the current value in Tape Counter being either incremented or decremented. Next, Control Means 36 will recognize any subsequently received Control Track Pulses 42. Finally, Control Means 36 will load Counter 32 with the count modulus twelve, as indicated by pulse 60 in FIG. 3C. Thereafter, the contents of Counter 32 will be decremented by one upon receipt of each sequential tachometer pulse, as indicated in FIG. 3A, beginning with pulse 62.

If there has been any type of slippage, the Control Track Pulse will be displaced from the selected tachometer pulse. This is illustrated by Control Track Pulse 62 (FIG. 3D), which occurs when the count in Counter 32 equals eight, as illustrated by pulse 64 in FIG. 3A. Control means 36, upon sampling the current contents of Counter 32, subtracts the value so determined (eight) from the expected value (six) and upon determination of a non-zero difference, will load Counter 32 with a new value (six) to effect an adjustment of the phase relation so detected, as illustrated by pulse 63 in FIG. 3C. The desired value loaded into Counter 32 in response to a detected phase error is a parameter determined at the time of system design, and can be so chosen as to vary depending upon the amount of phase error detected, e.g., if the count in Counter 32 was seven or eight, Counter 32 could be reloaded with the value of six, but if the phase error was greater, as would be indicated by the contents of Counter 32 being, for example, eleven, Counter 32 could be reloaded with nine. In this manner, the response of the present invention to a detected phase error can be adjusted to that desired for the particular system the present invention may be used in.

Thereafter, the contents of Counter 32 are sequentially decremented upon receipt of Tachometer Pulses 30, and the process continues as above described.

Consequently it is observed that the present invention, upon the detection of a phase error between Control Track Pulses 42 and Tachometer Pulses 30, responds thereto with a corresponding adjustment in phase which dynamically varies in magnitude depending upon the amount of phase error detected.

Furthermore, it is observed that disregarding subsequent Control Track Pulses upon the receipt of a first Control Track Pulse until the contents of the counter decrement to zero, results in improved immunity from noise results.

While the foregoing has described the present invention by means of a general functional description and a specific operational example, the following will describe the present invention in terms of the preferred embodiment, as illustrated in FIG. 4.

Microprocessor 70 communicates with the various devices associated therewith by Address Bus 72, Data Bus 74, and the following control signals: IRQ' 76, R/W' 78, and E 80. IRQ' 76 is the signal used by devices to notify Microprocessor 70 that they require attention, in particular IRQ' 76, is the interrupt signal for Microprocessor 70. R/W' 78 is the signal used by the Microprocessor 70 to indicate to external devices whether it is performing a read or write operation. E 80 is a timing signal. Microprocessor 70 was preferably implemented by a Motorola 6802 microprocessor.

Memory 82 serves to store the instructions and data associated with Microprocessor 70, and is preferably implemented using Erasable Read Only Memories Model 2732 produced by Intel Corporation, and Random Access Memories model 4118A produced by Mostek.

Address Decoder 84 functions to decode specific addresses present on Address Bus 72, generating a unique signal for each individual address decoded which is of interest: IRQ Request 112, IRQ Acknowledge 114, Counter Select 116, and a plurality of Display Select signals 118. Address Decoder 84 is preferably implemented with a Texas Instruments 74LS138.

Counter 86 functions to decrement by a count of one upon receipt of each Tachometer Pulse 30. Counter 86 is loaded with an initial value from Data Bus 74 upon the selection of Counter 86 by the address associated therewith being decoded by Address Decoder 84 to generate Counter Select signal 116. Concurrent with the generation of Counter Select signal 116, the value present on Data Bus 74 is transferred to Counter 86 upon the occurrence of W' signal 90, which is generated by Microprocessor 70 upon the execution of instructions appropriate to perform a write operation, thereby generating R/W' signal 78 and E signal 80.

In the preferred embodiment, Counter 86 is a decrementing counter, hence a change in tape direction will not result in a change of the direction of count by Counter 86. Consequently, the necessary change in counting sequence is performed by reloading Counter 86 with the difference between the count modulus and the current value present in Counter 86 upon a change in tape direction. By so doing, the count sequence so generated by Counter 86 will be the desired one, generating the necessary Count Equals Zero indication at the desired time.

The contents of Counter 86 are read by Microprocessor 70 upon the selection of Counter 86 by the address associated therewith being decoded by Address Decoder 84 to generate Counter Select 116. The contents of Counter 86 are thereafter transferred to Data Bus 74 upon the generation of R' signal 92 by Microprocessor 70. This is accomplished by Microprocessor 70 upon the execution of a read instruction which results in the generation of R/W' signal 78 and E signal 80. Counter 86 is preferably implemented by use of an Intel 8253.

Microprocessor 70 performs the necessary tape counting incrementing or decrementing, as the case may be depending upon the direction of tape motion, each time the contents of Counter 86 reach zero. The resultant count is supplied to the appropriate Latch 94 as defined by the individual addresses associated with the individual digits, as decoded by Address Decoder 84, generating Display signal 118, and subsequently displayed by Display 46.

The occurrence of a change in tape direction, a Control Track Pulse or the contents of Counter 86 reaching zero are communicated to Microprocessor 70 through the use of interrupts. The occurrence of each of the above events results in a Flip-Flop being set: the occurrence of a change in tape direction sets Flip-Flop 98, the occurrence of a Control Track Pulse sets Flip-Flop 100, and the occurrence of the contents of Counter 86 reaching zero sets Flip-Flop 102. The Flip-Flops associated with these events are preferably implemented using a Texas Instrument 74LS74.

The outputs of Flip-Flops 98, 100, and 102 are supplied to Priority Encoder 104. Priority Encoder 104 functions to generate a binary code which uniquely defines which of the currently active signals supplied to it has been assigned the highest priority, as defined by the manner in which the signals are connected to the inputs to Priority Encoder 104. The interrupts were arranged with Tachometer Pulse 30 having the highest priority, followed by Control Track Pulse 42, and Tape Direction Signal having the lowest priority of the three interrupts. Upon the occurrence of any signal or combination thereof to the inputs of Priority Encoder 104, Priority Encoder 104 generates IRQ' signal 106 which serves to notify Microprocessor 70 of the presence of an interrupt. Priority Encoder 104 is preferably implemented with a Texas Instrument 74LS148.

Upon the occurrence of an interrupt by the presence of IRQ' signal 106, Microprocessor 70 will place the appropriate Address on Address Bus 72 which is thereafter decoded by Address Decoder 84 to generate the appropriate signal on IRQ' Request signal 112 to enable the transfer of the output of Priority Encoder 104 by Tri-State Driver 108 onto Data Bus 74. In this manner, the souce of the interrupt can be determined. Tri-State Drivers 108 is preferably implemented using Texas Instruments 74LS541.

After Microprocessor 70 has responded to the interrupt, the appropriate interrupt Flip-Flop 98, 100 or 102 is thereafter selectively cleared by Microprocessor 70 placing the appropriate binary word on Data Bus 74 and thereafter placing the corresponding address on Address Bus 72 which, when decoded by Address Decoder 84 results in the generation of IRQ Acknowledge signal 114 which enables Latch 110. Latch 110 functions to hold the binary word present on Data Bus 74, and thereafter clears the appropriate Flip-Flop 98, 100, or 102 as defined by the binary word stored therein.

As Latch 110 will hold the Present inputs to Flip-Flops 98, 100 and 102; in the present state as long as the associated binary word is present in Latch 110, the duration of time during which subsequently occurring interrupts will be ignored can be easily controlled, i.e., when it is desired to recognize subsequently occurring interrupts, the input to the associated Flip-Flop will be allowed to return to their alternate state by the presence of the appropriate binary word being stored in Latch 110 by Microprocessor 70.

Furthermore, as each of the several Flip-Flops can be individually cleared by this arrangement, any outstanding interrupts which were of a lower priority and consequently not identified by Priority Encoder 104 will remain set, and result in the continual presence of IRQ' signal 106. The process will thereafter repeat until all interrupts have been communicated to Microprocessor 70.

The operation of the preferred embodiment of the present invention can best be understood with reference to FIG. 4 and FIG. 5 which illustrates in a flow chart format the operation of the present invention in response to Count Equals Zero, Control Track and Tape Direction Interrupts.

As the preferred embodiment was implemented using an interrupt driven Microprocessor design, Microprocessor 70 responds to Control Track Pulse signals, Count Equals Zero signals or Tape Direction signals when they occur. FIG. 5 illustrates the response of Microprocessor 70 in a flow chart format to the three individual interrupts. Response to a Count Equals Zero is shown in FIG. 5A, response to a Control Track Pulse is shown in FIG. 5B; and response to a Tape Direction Pulse is shown in FIG. 5C.

It will first be assumed that Counter 86 has been previously loaded with the count modulus, which in the preferred embodiment is twelve, and has thereafter decremented upon receipt of Tachometer Pulse 30 to the point where the contents thereof have reached zero. At this point, Count Equals Zero signal 40 will set Flip-Flop 102 which results in Priority Encoder 104 generating IRQ' signal 106 to Microprocessor 70 and simultaneously encoding said interrupt. Referring to FIG. 5A, Microprocessor 70 will respond by thereafter allowing Control Track Pulse 42 to interrupt and subsequently enabling flip-flop 100 by storing the appropriate binary word in Latch 110. Thereafter, Microprocessor 70 will up-date the tape count and output the current value to Tape Count Display 46. Next Microprocessor 70 will re-load Counter 86 with the count modulus, and then clear flip-flop 102 which clears the Count Equal Zero interrupt as above described. Microprocessor will thereafter return to the main program.

Upon the occurrence of a pulse on Control Track Pulse 42, flip-flop 100 will be set. This results in Priority Encoder 104 generating an IRQ' signal 106 and simultaneously encoding said interrupt. Referring to FIG. 5B, Microprocessor 70 will respond by noting that it will thereafter disregard further Control Track Pulses 42 and store the appropriate binary word in Latch 110 to result in flip-flop 100 remaining continuously pre-set. Next, Microprocessor 70 will determine the contents of Counter 86. Thereafter the contents of Counter 82 will be subtracted from the expected count. The presence of a non-zero difference will result in Microprocessor 70 determining the new count to be loaded into Counter 86 based upon the difference from values specified at the time of system design, and thereafter loading these values into Counter 86.

In the preferred embodiment, the number loaded into Counter 32 (FIG. 1) in response to a detected phase difference is determined by algebratically adding the numeric results of the subtraction process used to determine the presence of a phase shift to the current contents of Counter 32 if the absolute value of said difference is equal to or less than two. If the absolute value of said difference is greater than two, the number +3 or −3 is algebratically added to the current contents of Counter 32 depending upon the results of said substraction process being positive or negative, respectively. Microprocessor 70 will thereafter return to the main program. If the difference from the above described subtraction was zero, Microprocessor 70 would respond by returning to the main program without loading a new count into the counter.

Microprocessor 70 is informed of a change in the direction of tape travel by the occurrence of a pulse on Tape Direction signal 44, which results in Flip-Flop 98 being set. Thereafter, Priority Encoder 104 generates an IRQ' signal 76 to Microprocessor 70 which results in Microprocessor 70 first changing the direction of the count sequence in the tape counter (FIG. 5C). Next, Microprocessor 70 determines the current contents of Counter 86, and subtracts the contents thereof from the count modulus. The results of the substraction are thereafter loaded back into Counter 86. Thereafter, Microprocessor 70 clears the tape direction interrupt by clearing Flip-Flop 98 by the process of loading the appropriate binary word into Latch 110, and thereafter return to the main program.

While the present invention has been defined in terms of its general method of operation, a specific example, and a preferred embodiment, it would be apparent to anyone with ordinary skill in the art that many variations on the foregoing are possible without departing from the basic concept embodied herein, as defined by the following claims.

What is claimed is:

1. Apparatus for indicating the position of recording tape moved by a drive mechanism, comprising:
    means for developing periodic electrical first pulses related to movement of the drive mechanism;
    means for developing periodic electrical second pulses related to longitudinal spacing of recorded information on the tape;
    means for producing a first series of sequences of count pulses related to said first pulses;
    means for producing a second series of sequences of count pulses related to said second pulses;
    means for comparing said first series of sequences of count pulses with said second series of sequences of count pulses, said comparing means including:
    means for correcting said first series of sequences of count pulses upon the occurrence of a detected phase difference between said second series of sequences of second pulses and said first series of sequences of said first pulses whereby said first series of sequences of first count pulses are phase shifted by an amount related to the amount of phase difference between said first series of sequences of first pulses and said second series of sequences of second pulses; and
    means for producing an indication of tape position related to the count pulse sequences.

2. Apparatus according to claim 1 wherein said first pulse developing means comprises a tachometer pulse system.

3. Apparatus according to claim 1 wherein said second pulse developing means comprises means for sensing control track pulses on the recording tape.

4. Apparatus according to claim 1 wherein said count pulse sequence producing means comprises an electrical counter means adapted to reset a first time to a first count state after producing each sequence of count pulses, and adapted to reset a second time to a value determined by said means for changing said sequences of count pulses.

5. Apparatus according to claim 4 wherein said means for changing said sequences of count pulses further comprises means for preventing said electrical counter means from being reset said second time more than once during each count sequence.

6. A tape timer system for indicating the position of recording tape, moved by a drive mechanism, comprising:
    means for developing electrical first pulses related to the movement of the drive mechanism;
    means for developing periodic electrical second pulses related to the spacing of recorded information on the tape;
    electrical counter means adapted to produce periodic count pulses related to receipt of said first pulses, said counter means being adapted to being resettable;
    means coupled to said electrical counter means for indicating tape position related to the count pulse sequences produced by said electrical counter means; and,
    phase adjusting means adapted to receive the second pulse and being responsive to a phase difference between the second pulses and the first pulses to correct said electrical counter means to a value determined by the phase difference between the first and second pulses, whereby production of the sequences of count pulses by said electrical counter means is phase shifted in accordance with the occurrence of said second pulses.

7. A tape timer system according to claim 6 wherein said electrical counter means is adapted to produce periodic count pulses related to receipt of the first pulses, said electrical counter means being adapted to being resettable to a predetermined value after each series of count pulses.

8. A tape timer system for indicating the position of recording tape, moved by drive mechanism relative to a tape head, comprising:
    means for developing electrical first pulses related to a movement of the drive mechanism;
    means for developing electrical second pulses related to the spacing of recorded information on the tape;

counter means responsive to said first pulses, for sequencing through sequential states from a dynamically changeable first state to an ending state, and generating a counter signal upon reaching said ending state;

tape counter means responsive to said counter signal for indicating tape position; and, control means for supplying said counter means with a first state in response to said counter signal and in response to said second pulse comparing the current sequential state of said counter means with a predefined value, and in response to a difference between said current sequential state of said counter means and said predefined value supplying said counter means with a first state value, whereby said counter signal is phase shifted in accordance with the occurrence of said second pulses.

9. Apparatus as recited in claim 8 wherein said control means comprises apparatus whereby said first state supplied to said counter means in response to a difference between said current sequential state of said counter means and said predefined value is determined by the amount of said difference.

10. Apparatus as recited in claim 8 wherein said control means further comprises means so that subsequently received second pulses after the occurrence of a first second pulse are disregarded until after the occurrence of said next counter signal from said counter means.

11. A method for producing an output for indicating the position of recording tape relative to a tape head, comprising:

developing periodic electrical first pulses related to tape movement;

developing periodic electrical second pulses related to recorded information on the tape;

producing a series of pulse count sequence related to said first pulses;

updating said tape position indicating output at a preselected point in said pulse count sequences;

detecting the magnitude of a phase difference between said second pulses and second first pulses; and adjusting the length of said count sequence by an amount determined by said magnitude.

12. A method according to claim 11 wherein the indication of tape position is related to a portion of each sequence of count pulses which is displaced from the beginning thereof by an amount less than or equal to the maximum amount of phase shift.

13. A method according to claim 11 wherein the occurrences of subsequent second pulses following the occurrence of a first second pulse before the termination of a series of count pulses in progress is disregarded.

* * * * *

UNITED STATES PATENT AND TRADEMARK OFFICE
CERTIFICATE OF CORRECTION

PATENT NO. : 4,471,391
DATED : September 11, 1984
INVENTOR(S) : Rick L. Reagan

It is certified that error appears in the above-identified patent and that said Letters Patent is hereby corrected as shown below:

Column 1, line 55, change "controling" to --controlling--.

Column 7, line 68, change "souce" to --source--.

Column 8, line 65, after "Microprocessor" insert --70--.

Column 12, line 15, change "second first pulses" to --said first pulses--.

Signed and Sealed this

Seventeenth Day of September 1985

[SEAL]

Attest:

DONALD J. QUIGG

Attesting Officer

Commissioner of Patents and Trademarks—Designate